United States Patent [19]

Yen

[11] Patent Number: 5,719,851
[45] Date of Patent: Feb. 17, 1998

[54] OPTICAL DISK DATA STORAGE CARTRIDGE SYSTEM HAVING HINGED DISK RECEPTACLE WITH DUAL DISK SIDE ACCESS

[75] Inventor: Yu-Sze Yen, San Jose, Calif.

[73] Assignee: International Business Machines Corporation, Armonk, N.Y.

[21] Appl. No.: 527,816

[22] Filed: Sep. 13, 1995

[51] Int. Cl.⁶ ............................................. G11B 23/03
[52] U.S. Cl. ................................................ 369/291
[58] Field of Search ............................ 369/289–292; 360/133; 206/307, 308.1, 308.3

[56] References Cited

U.S. PATENT DOCUMENTS

| | | | |
|---|---|---|---|
| Re. 33,695 | 9/1991 | Ogusu | 369/291 |
| 4,639,813 | 1/1987 | Uno | 360/128 |
| 4,731,776 | 3/1988 | Ishii et al. | 369/77.2 |
| 4,746,013 | 5/1988 | Suzuki et al. | 369/291 |
| 4,755,982 | 7/1988 | Douwes | 369/291 |
| 4,867,302 | 9/1989 | Takahashi | 206/312 |
| 4,916,567 | 4/1990 | Grobecker et al. | 360/133 |
| 4,926,411 | 5/1990 | Ouwerkerk et al. | 369/291 |
| 5,140,489 | 8/1992 | Barnard | 360/133 |
| 5,150,354 | 9/1992 | Iwata et al. | 369/291 |
| 5,208,802 | 5/1993 | Suzuki et al. | 369/289 |
| 5,331,627 | 7/1994 | Childers et al. | 369/291 |
| 5,462,158 | 10/1995 | Kramer | 206/307 |
| 5,475,674 | 12/1995 | Yamashita et al. | 369/291 |
| 5,579,297 | 11/1996 | Childers et al. | 369/291 |

Primary Examiner—Robert S. Tupper
Assistant Examiner—Brian E. Miller
Attorney, Agent, or Firm—Douglas R. Millett; Andrew J. Dillon

[57] ABSTRACT

A cartridge receives a variety of optical disks. The cartridge has a hinged holding member for easy insertion and removal of the disks. The holding member is an integral cover having a shutter for access to apertures in both the primary and secondary cover. A optional rotatable hub is mounted within the cartridge. The cartridge is inserted into an optical drive that is able to operate with a variety of disks that may be inserted into the cartridge.

6 Claims, 4 Drawing Sheets

OPTICAL DISK DATA STORAGE CARTRIDGE SYSTEM HAVING HINGED DISK RECEPTACLE WITH DUAL DISK SIDE ACCESS

BACKGROUND OF THE INVENTION

1. Technical Field

The present invention relates, generally, to optical disk cartridge systems and, more specifically, to a cartridge that allows the removal of optical disks from the cartridge. More particularly still, the present invention relates to an optical disk cartridge that exposes portions of both sides of the disks during operation.

2. Description of Prior Art

Optical data storage systems, such as optical disk drives, use laser beams to record and read data to and from optical data storage disks. The optical disks are typically packaged in a cartridge in order to protect the disk and allow easy insertion and removal from the disk drive.

There are many kinds of optical disks. Compact disks (CD) have many variations, of which CD-Audio, CD-ROMS, and, recently, CD-Recordable, are the most prevalent. The prior two are read-only media with information encoded as embossed (stamped) pits or marks on the disk. The latter is a write-once read-many disk that uses a dye-polymer as a recording layer. These disks are typically single-sided, 120 mm in diameter and do not have an integral hub at the center.

Other optical disks follow ISO/ANSI/ECMA standards with file format and specifications designed specifically for computer data storage. They are write-once read-many (WORM) disks using ablative, phase-change, bi-alloy mixing technology, and erasable disks using magneto-optical and phase-change technology. These standard disks are 90 mm or 130 mm in diameter and have a central, integral hub. Typically, the 90 mm disks are single-sided, and the 130 mm disks are double-sided. There are also non-standard optical disks for computer data storage that are either 120 mm or 130 mm in diameter and may or may not have an integral hub. These data format disks typically are enclosed in cartridges to protect the user's data. The required cartridge and hub make these type of disks more costly and space-consuming than the CD type.

Currently, there are optical "jukeboxes" for accessing disks with cartridges, and ones for disks without cartridges. Interchangeability between these two systems require a cartridge for easy removability of media.

Accordingly, what is needed is an inexpensive optical disk cartridge that can receive a disk without a hub. The disks may be either single-sided or double-sided. This allows the disks to be accessed interchangeably between systems that require cartridges and those that do not.

SUMMARY OF THE INVENTION

It is one object of the present invention to provide an improved optical disk cartridge system.

It is another object of the present invention to provide a cartridge that allows the removal of optical disks from the cartridge.

It is yet another object of the present invention to provide an optical disk cartridge that exposes portions of both sides of the disks during operation.

According to the present invention, an optical data storage cartridge system is disclosed that comprises a housing member and dual shutter member mounted to the holding member. The housing member has an inner chamber sized to receive an optical disc and also has a disc holding member for providing access to the inner chamber and holding the optical disc in either the open or close position. The dual shutter member is sized to cover an aperture on a primary side of the holding member and aperture on the secondary side of the holding member. A hub aperture is also provided in the primary member and is covered by the shutter. The holding member is hinged mounted to the housing member. Further, the holding member has a locking means for locking the holding member in a closed position to the housing member. A spindle aperture is also provided in the holding member for providing access to a spindle to the inner chamber.

In alternative embodiment, a base member may also be provided that has an operative substantially cylindrical interior portion for receiving a hubless optical disc and having a first aperture. A rotatable hub member mounts to this first aperture. A disc holding member is provided that has a second aperture. The second aperture faces the inner portion of the base member. The disc holding member is located opposite the rotatable hub member and further comprises a primary cover is connected to a second cover. Both the primary and secondary covers have apertures facing one another for providing access to the interior portion of the holding member. Additionally, a shutter, which is attached to the holding member, has provided covers both the aperture on the second cover and the aperture on the primary cover as well as the first aperture within the primary member.

The optical data storage cartridge is suitable for use in an optical data storage cartridge system having a means for receiving the optical disc cartridge and rotation means for engaging the hub and rotating the disc, a radiation means for transmitting a beam of radiation to the disc, and a radiation reception means for receiving a radiation beam from the disc and generating a signal responsive thereto.

In each of these embodiments, the optical disc typically cylindrical in shape and may be either a write one read many, a read only disc, or any type rewritable optical disc.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
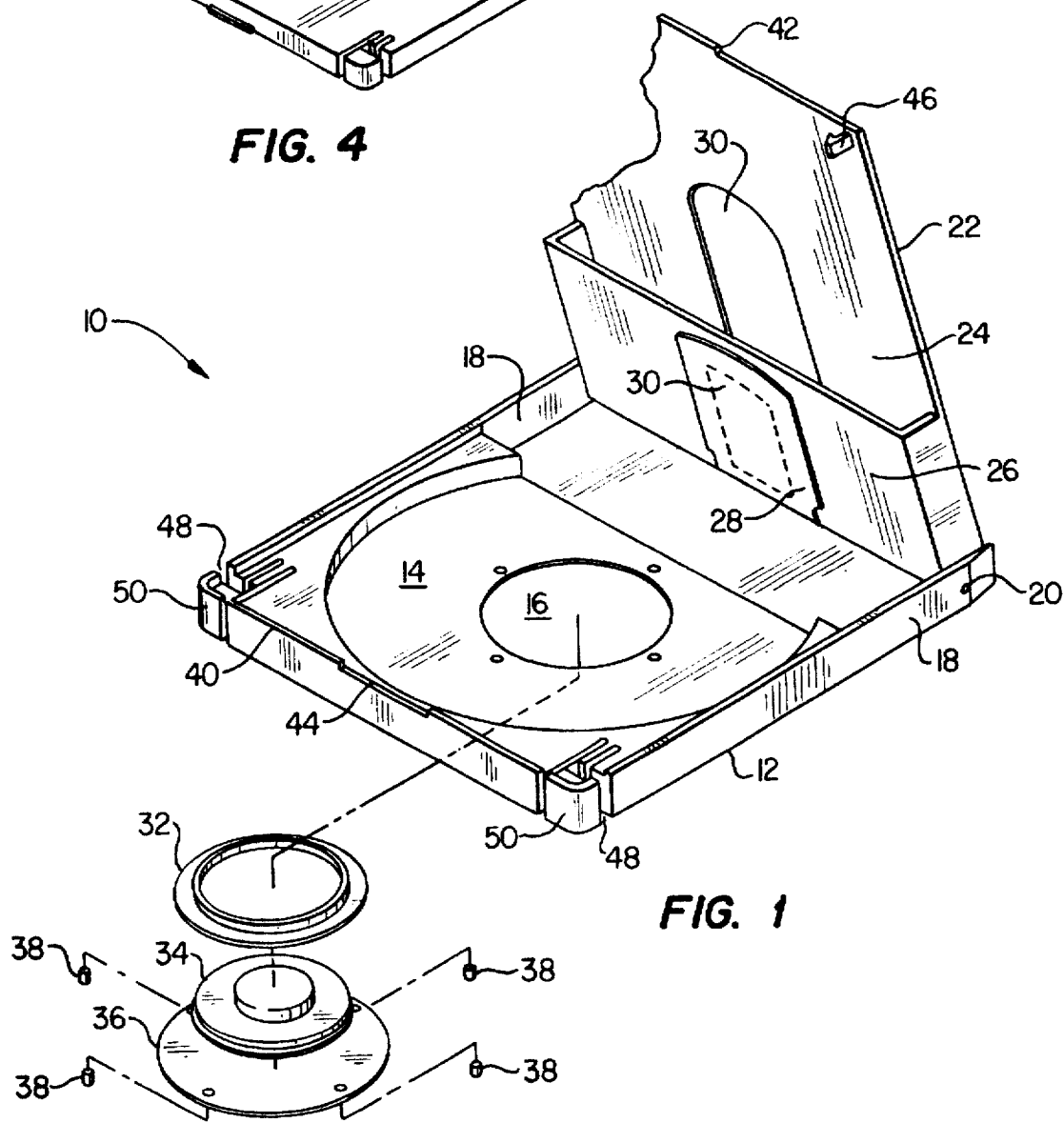
FIG. 1 shows a perspective view of an optical disk cartridge of the present invention and is designated by the general reference number.

FIG. 1 shows a perspective view of an optical disk cartridge of the present invention and is designated by the general reference number 10. A base member 12 has an inner chamber 14, which is substantially cylindrical in shape. Chamber 14 is sized to receive a large diameter optical disk. The floor of chamber 14 also has a hub aperture 16, for receiving a hub member. A pair of extension members 18 extend from the floor of chamber 14 and are designed to receive a second element of cartridge 10. A plurality of screws or detentes 20 in members 18 are used to hold disk holder member 22.

Disk holder member 22 is sized to cover base member 12 and enclose inner chamber 14. Holder member 22 includes a primary cover 24 and a secondary member 26 that, together, form a pouch for receiving an optical disk. Secondary member 26 is much shorter than primary cover 24 so that the aperture in the optical disk to be held can mount to the hub member of cartridge 10. A J-shaped shutter 28 fits to holder member 22 and extends from primary cover 24 to secondary member 26. Apertures 30 in both primary cover 24 and secondary member 26 are covered by shutter 28.

Base member 12 includes circular central hub aperture 16. Hub aperture 16 is positioned such that its center point is along the central axis of the cylindrical chamber 14. Aperture 30 in primary cover 24 will then be positioned over aperture 16. Hub aperture 16 receives a hub retaining ring 32. Ring 32 receives a hub member 34. A retaining plate 36 overlies retaining ring 32, and the two elements are attached to base number 12 by a plurality of screws 38. Alternatively, a cement may be used to attach ring 32 and plate 36.

Base 12 further has a flange 40 along its top surface to receive primary cover 24 when primary cover 24 is in a closed position. Primary cover 24 has a tab member 42 that is received by a gap 44 in flange 40. Tab 42 has a finger hold for opening primary cover 24.

Holder member 22 has a pair of latching hook members 46 that are received in slots 48 of base 12. The hooks 46 are latched to a pair of biased button members 50. Hooks 46 are released by pressing buttons 50 inward toward one another. Holder member 22 may then be opened.

Figure 2:
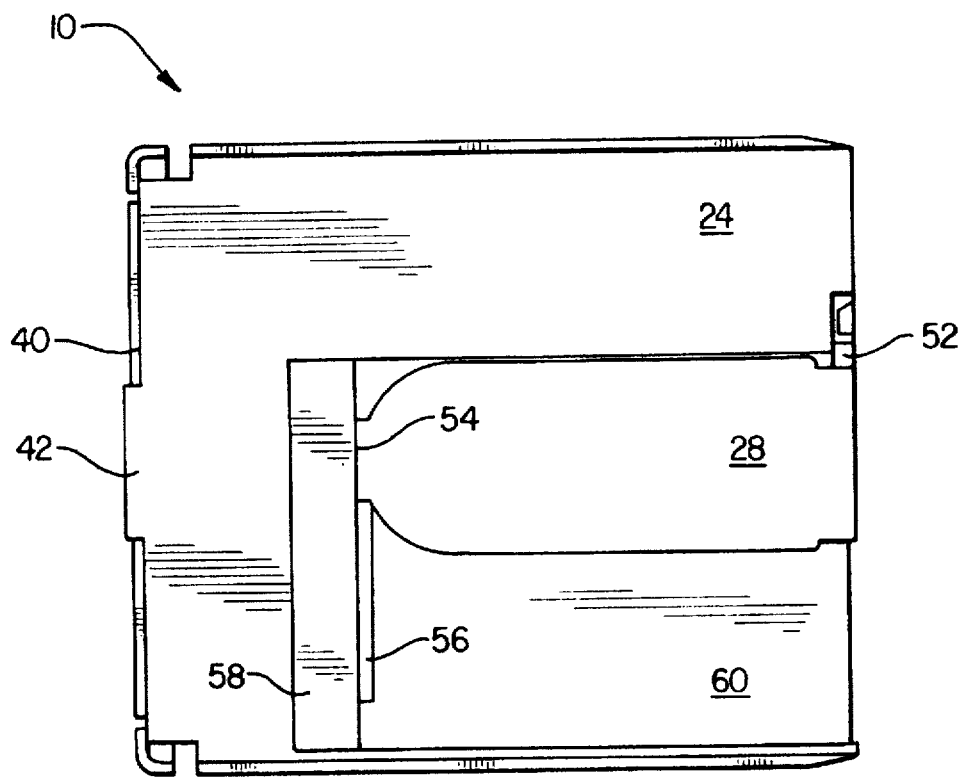
FIG. 2 is a bottom plan view of cartridge highlighting the shutter portion, which is part of cover.

Apertures 30 are covered by shutter 28. Shutter 28 is attached to a shutter closing member 52, which is shown in more detail in FIG. 2. FIG. 2 is a bottom plan view of cartridge 10 highlighting the shutter portion, which is part of cover 24. Shutter closing member 52 is any type of shutter closing mechanism typically used by those skilled in the art. Preferably, a shutter closing mechanism is used that is disclosed in commonly assigned U.S. Pat. application Ser. No. 08/425,685, filed Apr. 19, 1995, entitled "Optical Data Storage Cartridge System," herein incorporated by reference for all purposes. An end tab 54 of shutter 28 is bent to a lower elevation and is received in a retaining well 56 of holding member 22. A retaining strip 58 is glued over well 56 and traps tab 54 in place.

In a preferred embodiment, base 12 and holder member 22 are all made of a resilient plastic, such as polycarbonate. Ring 32, hub 34, plate 36, shutter 28 are all preferably made of stainless steel.

Figure 3:
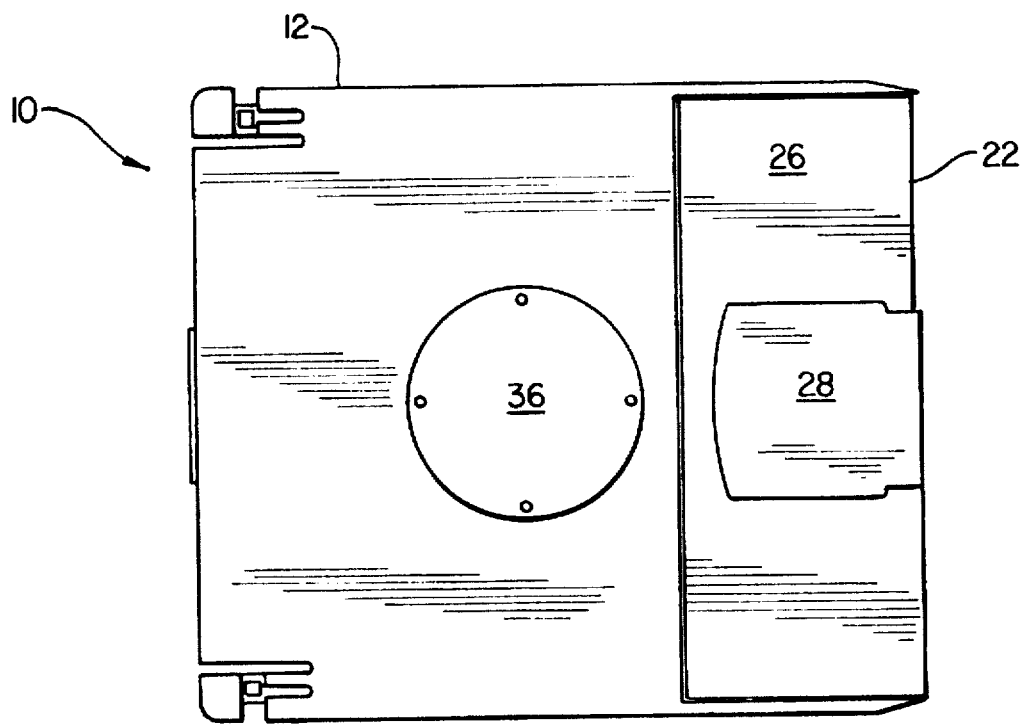
FIG. 3 shows a top plan view with holder member in a closed position.

FIG. 3 shows a top plan view with holder member 22 in a closed position.

Figure 4:
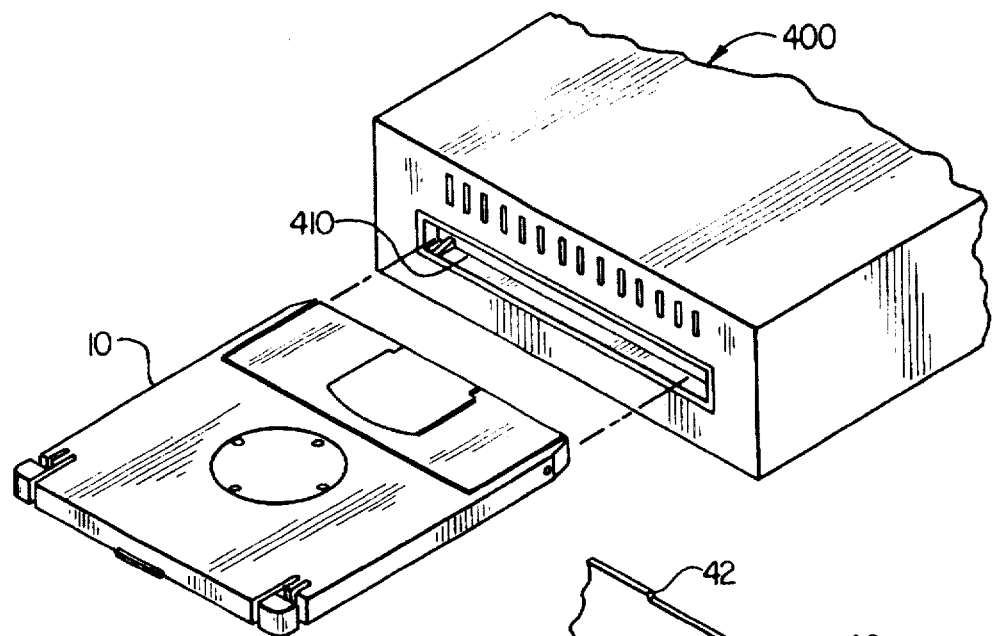
FIG. 4 shows a perspective view of cartridge and a disk drive of the present invention.

FIG. 4 shows a perspective view of cartridge 10 and a disk drive 400 of the present invention. A slot 410 is sized to receive cartridge 10.

Figure 5:
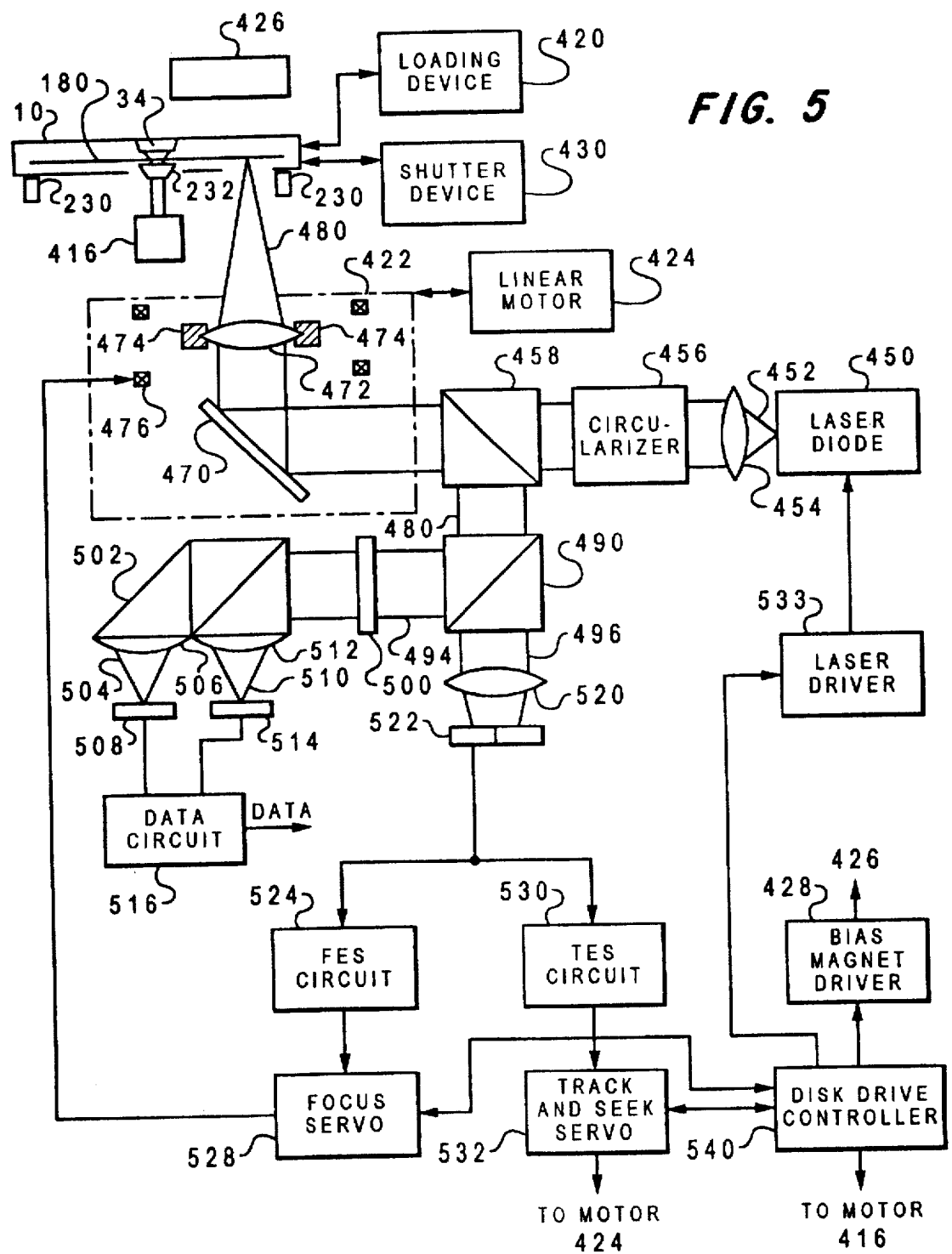
FIG. 5 shows a schematic diagram of cartridge and system.

FIG. 5 shows a schematic diagram of cartridge 10 and system 400. When cartridge 10 is inserted into drive 400, a loading device 420 loads cartridge 10 into and onto pads 230 and spindle clamp 232 engages hub 34. At the same time, a shutter device 430 engages shutter 28 and automatically opens shutter 28. Loading device 420 and shutter device 430 are well-known in the art. Spindle clamp 232 is attached to a spindle motor 416, which rotates optical disk 180. An optical head 422 is positioned below disk 180. Head 422 is moved in a radial direction relative to disk 180 by a linear motor 424. A bias magnet 426 is located above disk 180 and is connected to a bias magnet driver 428. A laser 450 produces a polarized light beam 452. Any type of laser may be used; however, laser 450 is preferably a gallium-aluminum-arsenide laser diode, which generates a light beam 452 at approximately 780 nanometers in wave length. Light beam 452 is collimated by lens 454 and circularized by circularizer 456. Circularizer 456 is preferably a prism.

Beam 456 passes through a beam splitter 458 to a mirror 470. Mirror 470 reflects beam 452 toward a focusing lens 472. Lens 472 focuses beam 452 onto disk 180. Lens 472 is mounted in lens holder 474. Holder 474 may be moved relative to disk 480 by actuator motor 476. Mirror 470, lens 472, holder 474 and motor 476 are preferably located in the optical head 422.

A light beam 480 is reflected from disk 180, passes through 472 and is reflected by mirror 470. A portion of light beam 480 is then reflected by beam splitter 458 to beam splitter 490. Beam splitter 490 divides beam 480 into a data beam 494 and a servo beam 496.

The data beam 494 passes through a half-wave plate 500 to a polarizing beam splitter 502. Beam splitter 502 divides beam 494 into two orthogonal polarization components. A first polarization component beam 504 is focused by a lens 506 to a data optical detector 508. A second polarization component 510 is focused by lens 512 to a data optical detector 514. A data circuit 516 is connected to detectors 508 and 514 and generates a data signal representative of the pattern of marks recorded on disk 180.

Servo beam 496 is focused by lens 520 onto a segmented optical detector 522, such as a spot-sized measuring detector, as is known in the art. A focus air circuit 524 is connected to detector 522. A focus servo 528, as known in the art, is connected to focus error signal (FES) circuit 524 and motor 476. Servo 528 controls motor 476 to adjust position of lens 472 as appropriate to maintain proper focus. A tracking error signal circuit 530 is connected to a detector 522. A detector and seek servo 532, as is known in the art, is connected to tracking error signal (TES) circuit 530 and motor 522. Servo 532 causes motor 424 to adjust position of head 422 as appropriate. A laser driver 533, as is known in the art, is connected to laser 450.

A disk drive controller 540, as is known in the art, is connected to and provides overall control for servos 528 and 532, spindle motor 418, laser driver 532 and magnet driver 432.

Figure 6:
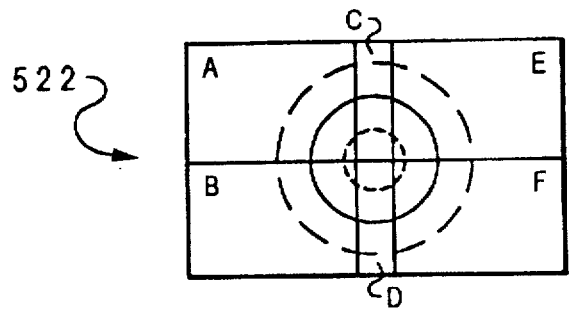
FIG. 6 shows a view of detector.

FIG. 6 shows a view of detector 522. Detector 522 is divided into six sections 522A, B, C, D, E and F.

Figure 7:
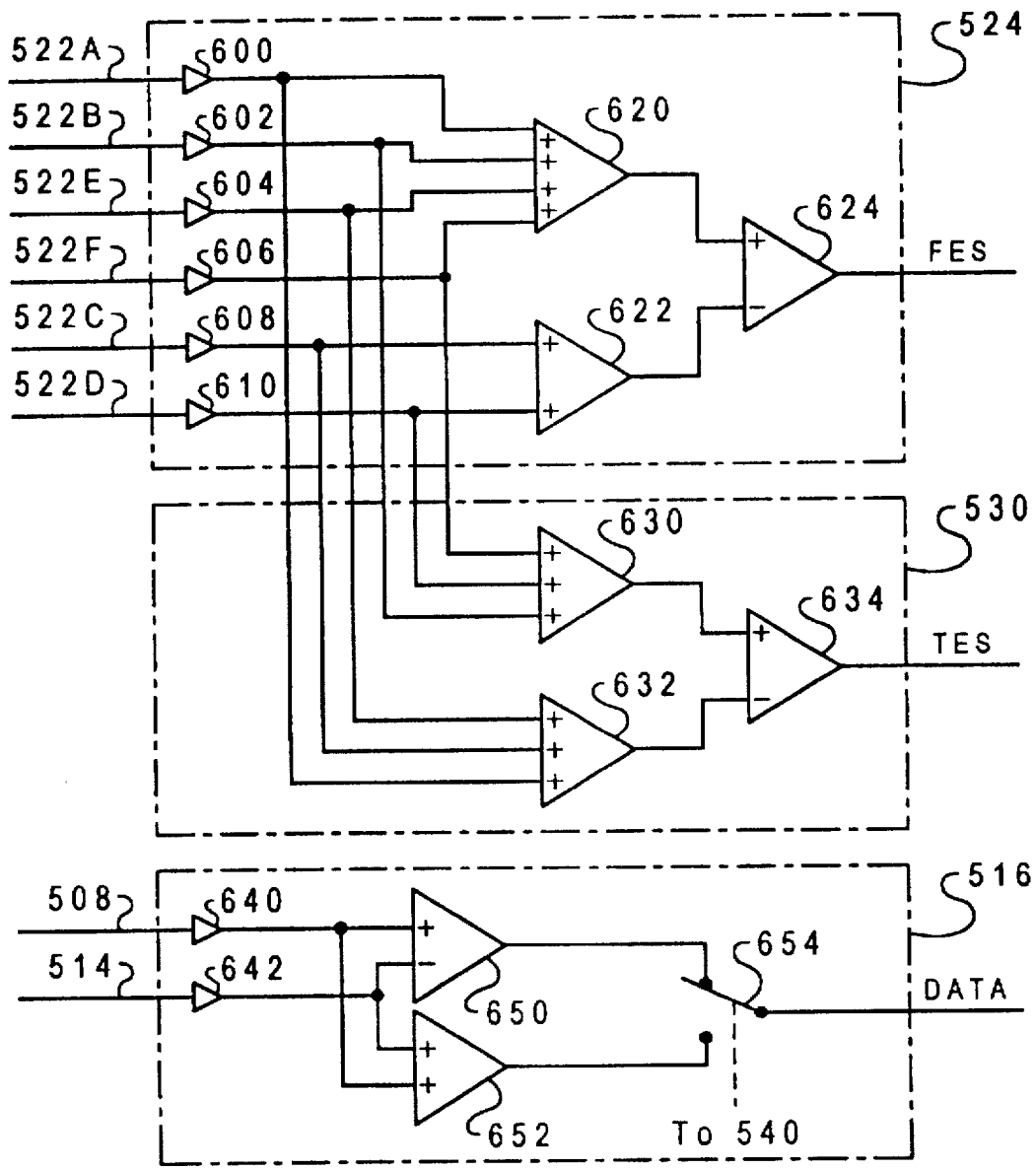
FIG. 7 shows a circuit diagram of the TES circuit, the FES circuit, and the data circuit.

FIG. 7 shows a circuit diagram of the TES circuit 530, the FES circuit 524, and the data circuit 516. FES circuit 524 comprises a plurality of amplifiers 600, 602, 604, 606, 608, 610 connected to detector sections 522A, B, E, F, C and D, respectively. A summing amplifier 620 is connected to amplifiers 600–606 and a summing amplifier 622 is connected to amplifier 608 and 610. A differential amplifier 623 is connected to a summing amplifier 620 and 622 and generates the FES.

TES circuit 530 comprises a pair of summing amplifiers 630 and 632 and a differential amplifier 634. Amplifier 630 is connected to amplifiers 602, 606 and 610; the amplifier 632 is connected to amplifiers 600, 604 and 608. Differential amplifier 634 is connected to amplifier 630 and 632 and generates a TES.

Data circuit 512 has a plurality of amplifiers 640 and 642 connected to detectors 508 and 514, respectively. A differential amplifier and a summing amplifier 652 are connected to amplifiers 640 and 642. Differential amplifier 650 generates a data signal for a polarization-sensitive optical disk such as a magneto optical disk, and summing amplifier 652 generates a data signal for a reflectivity-detecting disk such as a WORM, CD or CD-ROM disk. An electric switch 654 is connected to controller 540. Controller 540 selects the type of data signal depending upon the type of disk that has been inserted into the drive. The information as to the type of disk may be provided to the controller by the user, or alternatively, the controller may be programmed to select between the positions of switch 654 until a successful read of the disk has taken place.

Alternatively, other types of optical media discs do not require bias magnets or polarizing optics, so the play or record units contemplated for those types of media need not include such features as previously disclosed. Rather, the present embodiments are merely disclosed for illustrative purposes and are not meant to be limited in scope to only the system The advantages of the present invention may now be fully understood. Cartridge 10 uses an integrally constructed holding member 22 that eliminates the need for sophisticated attaching mechanisms for prior disk cartridge systems. Further, the primary and secondary covers 22 and 24 provide dual access to the top and bottom of any optical disk placed in cartridge 10.

A further advantage to the user of the present invention is that only one optical cartridge is needed. Various hubless optical disks may be exchanged with a single cartridge of the present invention for use in the disk drive. This eliminates the cost of providing a cartridge for each optical disk. When not in use, the optical disks may be stored in inexpensive paper sleeves or other inexpensive containment. Alternatively, due to the inexpensive and simplified manufacturing steps, more than one optical cartridge may be used by a user without the user having to replace disks in a single optical cartridge. This allows the disks to be stored in the cartridges until further needed and also to allow the user merely to install the cartridge rather than to swap disks from one cartridge to a sleeve.

Although the preferred embodiment has been shown using specific sizes of optical disks, it should be understood that the cartridge of the present invention may be used with other sized disks. The same concept applies to form factors such as two-inch, 90 mm, 120 mm, and 130 mm in diameter. Also, it is conceivable many form factors can be accommodated in one cartridge as long as the cartridge dimensions are compatible for those form factors. An adapter ring may be sized to accommodate these different sized disks.

In place of hub member 34, a hub clamp can be supplied in aperture 16, much like what is used in current CDROM optical systems.

For optical drives that do not require the media to supply a hub or a hub clamp, the hub member 34 is absent. In such a case, the cartridge can be designed for double-sided access so that users merely flip the cartridge to access either side of the disk. This forgoes removing the disk from the caddy, flipping it and replacing the disk back in the cartridge in order to access the other side of a double-sided disk.

While the invention has been particularly shown and described with reference to a preferred embodiment, it will be understood by those skilled in the art that various changes in form and detail may be made therein without departing from the spirit and scope of the invention.

What is claimed is:

1. An optical data storage cartridge system comprising:

a base member having a substantially cylindrical interior portion for receiving a hubless optical disk, said base member having a hub aperture therein;

a rotatable hub member mounted within said hub aperture;

a disk-holding member rotatably mounted along an edge of said base member, said disk-holding member further comprising a primary cover integrally connected to and facing a secondary member, thereby forming a pouch for receiving an optical disk, said primary cover and said secondary member each having an optical access aperture for providing optical access to an optical disk received within said pouch; and a shutter attached to said disk-holding member and rotatable therewith for covering each of said optical access apertures within said primary cover and said secondary member.

2. The system according to claim 1 wherein the disk-holding member is a hinge-mounted lid.

3. The system according to claim 1 wherein disk-holding member has a locking means for locking the disk-holding member in a closed position.

4. The system according to claim 1 wherein the optical disk comprises a WORM disk.

5. The system according to claim 1 wherein the optical disk comprises a re-writable disk.

6. The system according to claim 1 wherein the optical disk comprises a magneto-optical disk.

* * * * *